United States Patent

Harrison

[11] 3,972,779
[45] Aug. 3, 1976

[54] MEANS FOR CONTROLLING DEWAXING APPARATUS

[75] Inventor: Charles W. Harrison, Nederland, Tex.

[73] Assignee: Texaco Inc., New York, N.Y.

[22] Filed: July 26, 1974

[21] Appl. No.: 492,362

[52] U.S. Cl. .......................... 196/14.5; 23/253 A; 196/14.52; 196/132; 203/1; 203/2; 203/3; 208/33; 208/DIG. 1; 235/151.12; 235/151.13
[51] Int. Cl.² .................. B01D 11/04; C10G 43/08; G05B 21/02; G05B 24/02
[58] Field of Search ............... 196/14.5, 14.52, 132; 208/DIG. 1, 33; 235/151.12, 151.13; 23/230 A, 253 A; 202/160; 203/1, 2, 3

[56] References Cited
UNITED STATES PATENTS

| | | | |
|---|---|---|---|
| 2,565,489 | 8/1951 | Fischer | 208/33 X |
| 2,726,987 | 12/1955 | Macke | 208/33 |
| 3,202,602 | 8/1965 | Beaugh et al. | 208/33 |
| 3,458,432 | 7/1969 | Woodle et al. | 196/14.5 X |
| 3,506,564 | 4/1970 | Cone | 196/14.5 X |
| 3,549,514 | 12/1970 | Brown et al. | 196/14.5 X |
| 3,565,786 | 2/1971 | Brown et al. | 196/14.5 X |

Primary Examiner—Morris O. Wolk
Assistant Examiner—Michael S. Marcus
Attorney, Agent, or Firm—T. H. Whaley; C. G. Ries; Ronald G. Gillespie

[57] ABSTRACT

A control system controls the flow rates of waxy oil and solvent entering a dewaxing unit so as to control the viscosity of a chilled slurry mix or waxy oil and solvent provided to a filter in the dewaxing unit. The dewaxing unit includes valves controlling the flow rates of the solvent and waxy oil being provided to the chiller. The filter provides a dewaxed oil and solvent mixture and wax. Using the equation hereinafter mentioned, the control apparatus utilizes the sensed refractive index of the solvent, the sensed viscosity of the waxy oil, the sensed flow rates of the solvent and the waxy oil, and the sensed filtering temperature of the chilled slurry mix to generate a signal corresponding to the viscosity of the slurry mix provided to the filter at the filtering temperature. The viscosity of the chilled slurry mix is controlled within predetermined limits by a generating signal corresponding to the dilution ratio of the solvent to the waxy oil. The dilution signal is used to provide control signals to valves controlling the flow rates of the waxy oil and of the solvent to achieve the desired ratio which results in a desired viscosity of the chilled slurry mix.

18 Claims, 4 Drawing Figures

MEANS FOR CONTROLLING DEWAXING APPARATUS

BACKGROUND OF THE INVENTION

Field of the Invention

The present invention relates to control systems in general and, more particularly, to a control system for a solvent-dewaxing unit.

SUMMARY OF THE INVENTION

A system controls a dewaxing unit in which solvent is mixed with waxy oil at some ratio of solvent to waxy oil and the solvent-waxy oil mixture is chilled to some filtering temperature by a chiller to become a slurry mix which is provided to a filter. The filter provides a dewaxed oil and solvent mixture and wax. The control system includes apparatus for controlling the flow rate of the waxy oil and the solvent in accordance with control signals so as to control the solvent-waxy oil dilution ratio. The flow rates of the solvent and the waxy oil are sensed and signals are provided corresponding to the sensed flow rates. A source provides reference signals corresponding to limits for the viscosity of the slurry mix at the filtering temperature. Apparatus determines the viscosity of the waxy oil and the refractive index of the solvent to provide corresponding signals. The temperature of the slurry mix is sensed and a temperature signal is provided. A circuit provides the control signals to the control apparatus in accordance with the sensed flow rate signals, the sensed temperature signal, the refractive index signal and waxy oil viscosity signal so that the apparatus controls the flow rates of the solvent and the waxy oil to achieve a desired viscosity of the slurry mix at the filtering temperature.

The objects and advantages of the invention will appear hereinafter from a consideration of the detailed description which follows, taken together with the accompanying drawings, wherein one embodiment of the invention is illustrated by way of example. It is to be expressly understood, however, that the drawings are for illustration purposes only, and are not to be construed as defining the limits of the invention.

DESCRIPTION OF THE INVENTION

Figure 1:
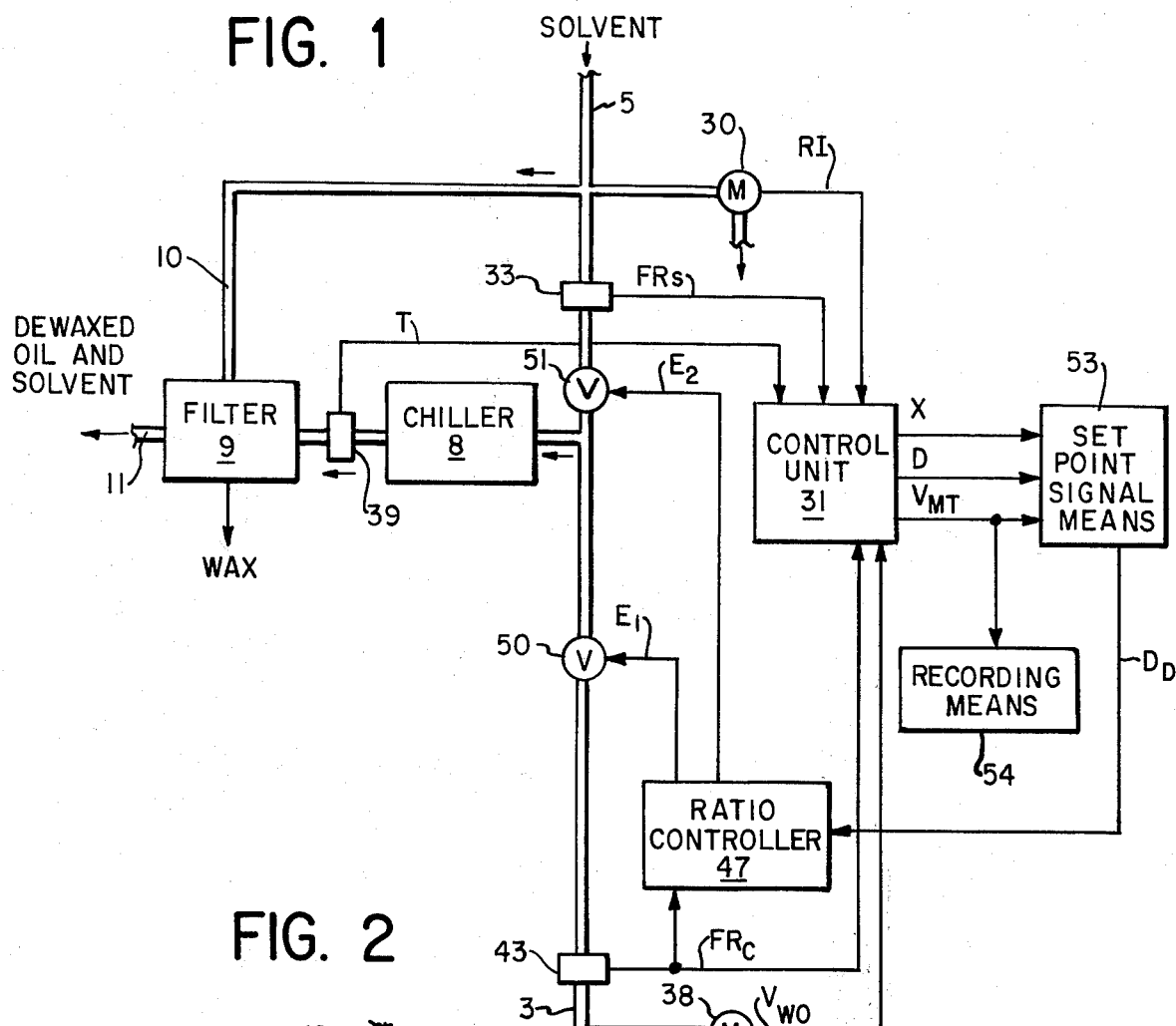
FIG. 1 shows a simplified block diagram of a control system, constructed in accordance with the present invention, for controlling the dilution ratio of solvent to waxy oil in a dewaxing unit, which is shown in partial schematic form.

Referring to FIG. 1, there is shown a conventional type dewaxing unit in which waxy oil enters by way of a line 3 and co-mingles with a solvent which may be MEK/Toluene, entering by way of a line 5 to form a solvent-waxy oil mixture which is provided to a chiller 8. Chiller 8 chills the solvent-waxy oil mixture to approximately 0°F at which point wax in the waxy oil solidifies. The chilled slurry mix provided by chiller 8 is applied to a filter 9 which removes the wax and provides the dewaxed oil and solvent for further processing. Filter 9 also receives solvent by way of line 10 for use in washing as hereinafter explained.

Figure 2:
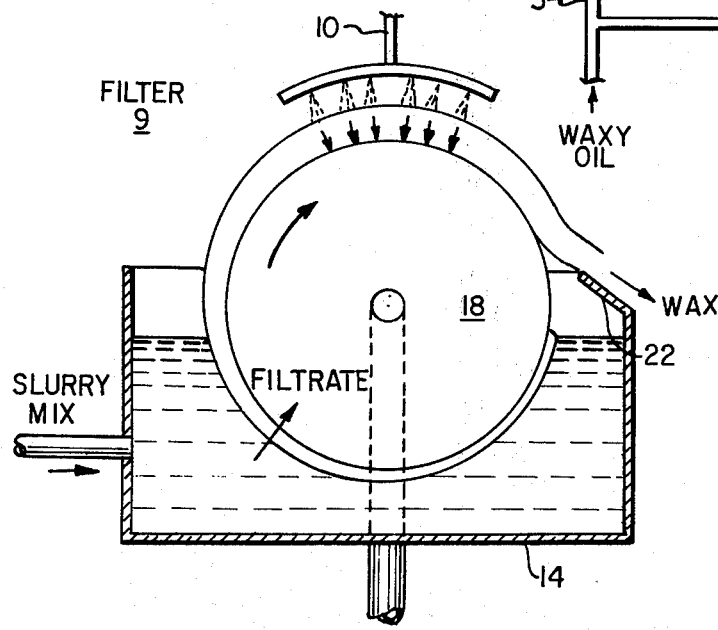
FIG. 2 is a diagrammatic representation of the filter shown in FIG. 1.

Referring to FIG. 2, there is shown a representation of filter 9 in which the slurry mix enters a tank 14. Tank 14 holds the slurry mix to a level permitting a drum 18 to have a canvas surface passing through the slurry mix. An internal vacuum is provided in drum 18 which is also continually being washed by wash solvent spray from line 10. As drum 18 rotates its canvas surface passes through the slurry mix, the vacuum draws the liquid portion of the slurry mix through the canvas leaving the wax on the surface of the drum 18. As drum 18 rotates the wax is carried to the top of drum 18 where it is washed by spray solvent from line 10. The wash solvent penetrates through the caked wax and mixes with the solvent dewaxed oil solution inside drum 18. As the drum rotates further, the wax is scraped off by a member 22 leaving a fresh canvas surface to filter more oil.

The present invention controls the dilution ratio of solvent to waxy oil entering chiller 8 so as to control the viscosity of the slurry mix to obtain an optimum condition utilizing the following equations. The dilution D of the slurry mix is the ratio of the solvent flow rate $FR_s$ to the charge waxy oil flow rate $FR_c$.

$$D = FR_s / FR_c \tag{1}$$

A factor X may be determined from equation 2.

$$X = D/(1+D) \tag{2}$$

The factor $X$ has a relationship to the viscosity $V_{mo}$ of the slurry mix at 0°F as shown in equation 3.

$$\ln V_{mo} = X^2(J.C^2 + K_o.C + L) + X(H.C + G) + F \tag{3}$$

where $J$, $C$, $L$, $H$, $G$ and $F$ are defined in the following equations.

$$C = \frac{K_1 - RI}{K_2} \tag{4}$$

where RI is the refractive index of the solvent at 20°C, C is the fractional concentration of MEK in the solvent, $K_1$ and $K_2$ are constants having value ranges of 1.3775 to 1.4965 and 0.05 to 0.119, respectively, and preferred values of 1.4965 and 0.119, respectively.

$$F = K_3 + K_4(\ln V_{DO}) \tag{5}$$

where $V_{DO}$ is the dewaxed oil viscosity in centistokes and $K_3$ and $K_4$ are constants having value ranges 1 to 1.5 and 2 to 3, respectively, and preferred values of 1.054 and 2.5, respectively.

$$G = K_5 + K_6(\ln V_{DO}) \tag{6}$$

where $K_5$, $K_6$ lie within ranges of 2 to 3 and 0 to $-10$, respectively, and have preferred values of 2.569 and $-7.06$, respectively.

$$H = K_7 + K_8(\ln V_{DO}) \tag{7}$$

where $K_7$, $K_8$ lie within ranges of 0 to $-10$ and 0 to 10, respectively and have preferred values of $-8.758$ and 6.22, respectively.

$$J = K_9 + K_{10}(\ln V_{DO}) \tag{8}$$

where $K_9$, $K_{10}$ lie within ranges of 0 to $-10$ and 0 to 10, respectively, and have preferred values of $-4.544$ and $3.37$, respectively.

$$K_0 = K_{11} + K_{12}(\ln V_{DO}) \tag{9}$$

where $K_{11}$, $K_{12}$ lie within ranges of 10 to 20 and $-5$ to $-15$, respectively, and have preferred values of 13.482 and $-10.16$, respectively.

$$L = K_{13} + K_{14}(\ln V_{DO}) \tag{10}$$

where $K_{13}$, $K_{14}$ lie within ranges of 0 to $-10$ and 0 to 10, respectively, and have preferred values of $-4.775$ and 5.6, respectively.

Further, the viscosity $V_{mo}$ of the slurry mix at 0°F may be used to determine the viscosity $V_{mT}$ of the slurry mix at the filtering temperature using equation 11.

$$\ln V_{mT} = \ln V_{mo} + K_{15}(\ln V_{mo})\left(\frac{T}{K_{16}}\right)^2 - [K_{17} + (K_{18})(\ln V_{mo})]\left(\frac{T}{K_{16}}\right) \tag{11}$$

where T is the filtering temperature and constants $K_{15}$, $K_{16}$, $K_{17}$ and $K_{18}$ lie within ranges of 0 to 1, 50 to 156, 0 to 1 and 0.5 to 1.5, respectively, and have preferred values of 0.69, 100.0, 0.631 and 0.911, respectively.

The dewaxed oil viscosity $V_{FO}$ may be determined from equation 12.

$$V_{DO} = (K_{19})(V_{210}) - \frac{(K_{20})_3(V_{210})}{(V_{210} + K_{21})} \tag{12}$$

where $V_{210}$ is the Saybolt Viscosity at 210°F of the dewaxed oil, and $K_{19}$, $K_{20}$ and $K_{21}$ are constants within ranges of 0 to 0.5; 10,000 to 12,000 and 35,000 to 40,000, respectively, and have preferred values of 0.21443; 11,219 and 37,755, respectively. The viscosity $V_{210}$ may be determined from the sensed Saybolt Viscosity $V_{wo}$, at 210°F of the waxy oil using equation 13.

$$\log V_{210} = K_{22} + (K_{23})(\log V_{wo}) + (K_{24})(\Delta POUR) \tag{13}$$

where $\Delta POUR$ is the pour point reduction which is the predetermined difference between waxy oil pour and dewaxed oil pour and constants $K_{22}$, $K_{23}$ and $K_{24}$ lie within ranges of 0 to $-0.5$, 0.5 to 1.5 and 0 to 0.01, respectively, and have preferred values of $-0.2055$, 1.0432 and 0.001021, respectively.

Wherever a signal or a voltage in the following description corresponds to a term in an equation, it will be identified as that term.

Referring again to FIG. 1, a refractive index meter 30 samples the solvent in line 5 and provides a signal RI corresponding to the refractive index of the solvent to a control unit 31. Meter 30 disposes of the sample solvent as slop. A flow rate sensor 33 in line 5 provides a signal $FR_s$ corresponding to the solvent flow rate to control unit 31.

A viscosity meter 38 samples the waxy oil in line 3 and provides a signal $V_{wo}$, corresponding to the viscosity of the waxy oil at 210°F to control unit 31. Meter 38 disposes of the sample waxy oil as slop. A flow rate sensor 43 senses the flow rate of the waxy oil and provides a signal $FR_c$ corresponding to the flow rate of the waxy oil to control unit 31 and to a ratio controller 47. Ratio controller 47 provides signals $E_1$, $E_2$ to values 50 and 51, respectively, in lines 3 and 5, respectively, to control the ratio of solvent to waxy oil. Ratio controller 47 receives a signal $D_D$ corresponding to the desired dilution ratio from set point signal means 53. Set point signal means 53 receives signals X, D and $V_{mT}$ from control unit 31. Signal $V_{mT}$ is recorded by recording means 54 to provide a visual indication and record of the viscosity of the slurry mix at the filtering temperature.

Figure 3:
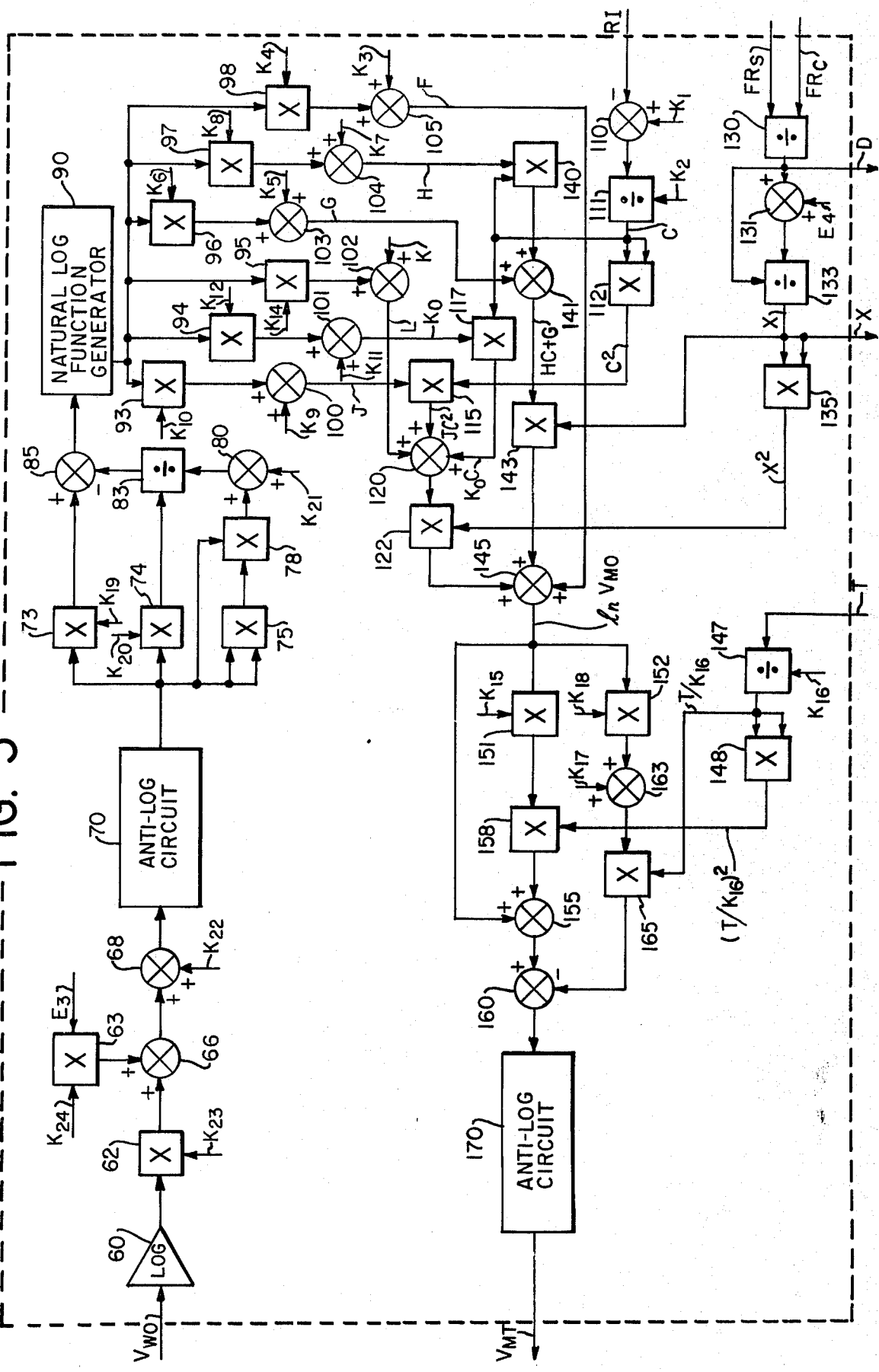
FIGS. 3 and 4 are detailed block diagrams of the control unit and the set point signal means, respectively, shown in FIG. 1.

Referring now to FIG. 3, signal $V_{wo}$ is supplied to a logrithmic amplifier 60 which provides a signal log $V_{wo}$ to a multiplier 62 where it is multiplied with a direct current voltage $K_{23}$. Another multiplier 63 multipies a direct current voltage $K_{24}$ with another direct current voltage $E_3$, which corresponds to a predetermined pour point reduction $\Delta$Pour. Summing means 66 sums the signals from multipliers 62, 63 to provide a signal to summing means 68 where it is summed with a direct current voltage $K_{22}$. Summing means 68 provides a signal log $V_{210}$, corresponding to the log of the dewaxed oil viscosity, SUS at 210°F, to an antilog circuit 70. Circuit 70 provides a signal $V_{210}$ to multipliers 73, 74, 75.

Multiplier 75 effectively squares signal $V_{210}$ and provides it to another multiplier 78 where it is multiplied with signal $V_{210}$ so as to effectively cube signal $V_{210}$. Summing means 80 sums the signal from multiplier 78 with a direct current voltage $K_{21}$ to provide a signal $V_{210}{}^3 + K_{21}$.

Multiplier 74 multiplies signal $V_{210}$ with a direct current voltage $K_{20}$, to provide a signal $K_{20} V_{210}$. A divider 83 divides the signal from multiplier 74 with the signal from summing means 80 to provide a corresponding signal. Multiplier 73 multiplies signal $V_{210}$ with a direct current voltage $K_{19}$ to provide a signal $K_{19} V_{210}$. Subtracting means 85 subtracts the signal provided by divider 83 from signal $K_{19} V_{210}$ to provide a signal $V_{DO}$ corresponding to the dewaxed oil viscosity in centistokes.

A natural log function generator 90 receives signal $V_{DO}$ from subtracting means 85 and provides a signal ln $V_{DO}$, corresponding to the natural log of the dewaxed oil viscosity, to a plurality of multipliers 93 through 98 receiving direct current voltages $K_{10}$, $K_{12}$, $K_{14}$, $K_6$, $K_8$ and $K_4$, respectively, and providing product signals. The product signals from multipliers 93 through 98 are summed with direct current voltages $K_9$, $K_{11}$, $K_{13}$, $K_k$, $K_7$, and $K_3$, respectively, by summing means 100 through 105, respectively, to provide signals J, $K_o$, L, G, H and F, respectively.

Refractive index signal RI is subtracted from a direct current voltage $K_1$ by subtracting means 110. A divider 111 divides the signal provided by subtracting means 110 by a direct current voltage $K_2$ to provide a signal C corresponding to the fractional concentration of MEK in the solvent. A multiplier 112 effectively squares signal C to provide a signal $C^2$.

A multiplier 115 multiplies signal $C^2$ with signal J to provide a signal $JC^2$. Another multiplier 117 multiplies signal C with signal $K_o$ to provide a signal $K_oC$. Summing means 120 sums signal $JC^2$, signal $K_oC$ and signal L to provide a corresponding signal to a multiplier 122.

A divider 130 divides signal $FR_s$ with signal $FR_c$ to provide a signal D corresponding to the dilution ratio of solvent to waxy oil. Summing means 131 sums signal D with a direct current voltage $E_4$ corresponding to a value of 1 provide a signal (1+D) to a divider 133. Divider 133 divides the D signal with signal (1+D) to provide a signal X. A multiplier 135 receiving signal X effectively squares signal X to provide a signal $X^2$.

A multiplier 140 multiplies signal H from summing means 104 with signal C from divider 111 to provide a signal HC to summing means 141. Summing means 141 sums signal HC with the G signal to provide a signal (HC+G).

A multiplier 143 multiplies signal X with signal (HC+G). Summing means 145 sums the signals from summing means 105, and multipliers 122 and 143 to provide a signal ln $V_{mo}$ which corresponds to the natural log of the viscosity of the slurry mix at 0°F in centistokes.

Signal ln $V_{mo}$ and temperature signal T are used to develop signal $V_{mT}$ corresponding to the viscosity of the slurry mix at the filtering temperature. A divider 147 divides signal T with a direct current voltage $K_{16}$ to provide a signal $T/K_{16}$. A multiplier 148 squares signal $T/K_{16}$ to provide a signal $(T/K_{16})^2$.

Summing means 145 provides signal ln $V_{mo}$ to multipliers 151, 152 and to summing means 155. Multiplier 151 multiplies signal ln $V_{mo}$ with a direct current voltage $K_{15}$ to provide a signal $K_{15}(\ln V_{mo})$. A multiplier 158 multiplies signal $K_{15}(\ln V_{mo})$ with signal $(T/K_{16})^2$ to provide a signal $K_{15}(\ln V_{mo})(T/K_{16})^2$ to summing means 155. Summing means 155 provides a signal ln $V_{mo}+K_{15}(\ln V_{mo})(T/K_{16})^2$ to subtracting means 160.

Multiplier 152 multiplies signal ln $V_{mo}$ with a direct current voltage $K_{18}$ to provide a signal $K_{18}$ ln $V_{mo}$ to summing means 163. Summing means 163 sums signal $K_{18}$ ln $V_{mo}$ with a direct current voltage $K_{17}$ to provide a signal $(K_{17}+K_{18}\ln V_{mo})$. A multiplier 165 multiplies the signals from divider 147 and summing means 163 with each other to provide a signal $(K_{17}+K_{18}\ln V_{mo})(T/K_{16})$.

Subtracting means 160 subtracts signal $(K_{17}+K_{18}$ ln $V_{mo})(T/K_{16})$ from the signal provided by summing means 155 to provide a signal ln $V_{mT}$. Anti-log circuit 170 receives signal ln $V_{mT}$ and provides signal $V_{mT}$.

Figure 4:
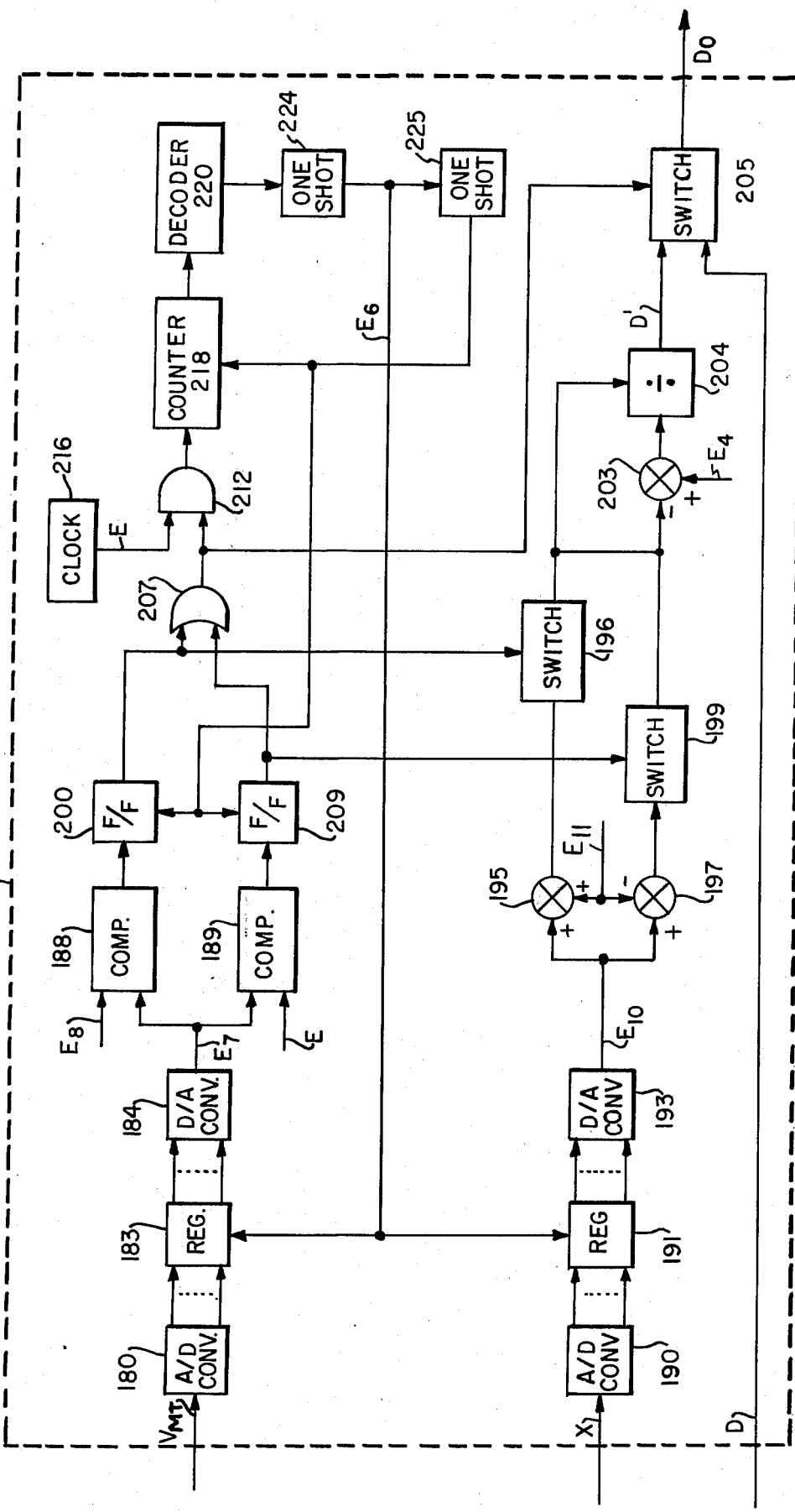

Referring to FIG. 4, an analog-to-digital converter 180, in set point signal means 53, converts analog signal $V_{mT}$ to digital signals and provides them to a storage register 183. Storage register 183 is controlled by a pulse $E_6$ to enter digital signals from converter 180 as hereinafter explained. Storage register 183 provides digital signals to a digital-to-analog converter 184 which provides a signal $E_7$ corresponding to the stored $V_{mT}$ signal to comparators 188 and 189. Comparator 188 compares signal $E_7$ with a direct current voltage $E_8$ corresponding to an upper limit for the viscosity of the slurry mix at the filtering temperature. Similarly, comparator 189 compares signal $E_7$ with a direct current voltage $E_9$ corresponding to a lower limit for the viscosity of the slurry mix at the filtering temperature. When the signal $E_7$ is greater than signal $E_8$, comparator 188 provides a low level output and when signal $E_7$ is less than the signal $E_9$, comparator 189 provides a low level output. When signal $E_7$ is within the limits of signals $E_8$ and $E_9$, comparators 188, 189 provide high level outputs. Thus, by selecting an extremely narrow range between the limits, the viscosity $V_{mT}$ of the slurry mix at the filtering temperature can be substantially held to a particular value. Comparators 188, 189 are used to increase or decrease the dilution ratio as hereinafter explained.

Signal X is applied to analog-to-digital converter 190 where it is converted to digital signals and applied to a storage register 191 receiving pulse $E_6$. Storage register 9 provides digital signals to a digital-to-analog converter 193 which provides an analog signal $E_{10}$ corresponding to the stored signal X. Summing means 195 sums signal $E_{10}$ with a direct current voltage $E_{11}$ corresponding to a predetermined change $\Delta X$ to be made in x. Summing means 195 provides a signal $X^I$ to an electronic single pole, single throw switch 196 corresponding to an increase value for X. Similarly, subtracting means 197 subtracts voltage $E_{11}$ from signal $E_{10}$ to provide a signal $X^{II}$ to a switch 199 corresponding to a decrease value for X.

For the condition that the viscosity $V_{mT}$ is greater than its upper limit, the output from comparator 188 goes to a low level triggering a flip flop 200 to a set state. In a set state, flip flop 200 provides a high level signal to a switch 196 rendering switch 196 conductive to pass the signal for summing means 195. When flip flop 200 is in a clear state, it provides a low level output to switch 196 rendering it non-conductive to block the signal from summing means 195. The passed signal from switch 196 is applied to subtracting means 203 and to a divider 204. Subtracting means 203 subtracts the passed signal $X^{II}$ from voltage $E_4$ to provide a signal $1-X^{II}$ to divider 204. Divider 204 divides the passed $X^{II}$ signal from switch 196 with the signal from subtracting means 203 to provide a signal $D'$ to an electronic single pole, double throw switch 205.

The high level signal from flip flop 200 passes through an OR gate 207 to control switch 205 to pass signal $D'$ from divider 204 as the $D_D$ signal. When flip flop 200 is in a clear state and another flip flop 209 is also in a clear state, OR gate provides a low level output causing switch 205 to pass signal D from divider 130 in control unit 31 as the $D_D$ signal.

Since switch 205 is controlled by flip flop 200 to pass signal $D'$ as the $D_D$ signal the set point position in ratio controller 47 changes accordingly. Controller 47 provides signal $E_1$, $E_2$ accordingly to increase the solvent to waxy oil ratio.

Similarly, when the viscosity $V_{mT}$ of the slurry mix is lower than its lower limit, comparator 189 triggers flip flop 209 to a set state. The high level output from flip fop 209 passes through OR gate 207 to control switch 205 as heretofore explained. The high level voltage from flip flop 209 also controls switch 199 to pass a signal $X'$ from subtracting means 197 corresponding to a decreased value for X to subtracting means 203 and divider 204. The result is that $D_D$ will change accordingly to reduce the dilution ratio.

A high level output from either flip flop 200 or 209 passes through OR gate 207 to enable an AND gate 212 to pass timing pulses $E_{14}$ from a clock 216 to a counter 218. Counter 218 is essentially used as a time delay. The count in counter 218 is decoded by a decoder 220 and upon reaching of a predetermined count triggers a one shot multivibrator 224 which provides pulse $E_6$ to enter the values into registers 183, 191. Pulse $E_6$ also triggers another one shot multivibrator 225 which provides a reset pulse to flip flops 200 and 209 to reset them to the clear state.

The invention as heretofore described controls a solvent dewaxing unit to achieve a desired viscosity for slurry mix at a filtering temperature. The system includes sensors sensing the flow rates of the solvent and waxy oil, the temperature of the slurry mix entering a filter, the refractive index of the solvent and the viscosity of the waxy oil, and controls the dilution ratio of solvent to waxy oil.

What is claimed is:

1. A system for controlling dewaxing apparatus in which solvent is mixed with waxy oil at some ratio of solvent to waxy oil and the solvent-waxy oil mixture is chilled to some filtering temperature by chiller means to become a slurry mix which is provided to filtering means also receiving wash solvent at a predetermined flow rate and which provides a dewaxed oil and solvent mixture and wax, said control system comprising flow control means for controlling the flow rates of the waxy oil and the solvent to the chiller means so as to control the solvent-waxy oil ratio, flow rate sensing means for sensing the flow rates of the solvent and the waxy oil and providing signals corresponding thereto, reference signal means for providing reference signals corresponding to limits for the viscosity $V_{mT}$ of the slurry mix leaving the chiller means at a filtering temperature, viscosity sensing means for determining the viscosity of the waxy oil and providing a corresponding signal, refractive index means for determining the refractive index RI of the solvent and providing a signal corresponding thereto, temperature sensing means for sensing the temperature T of the slurry mix leaving said chiller means prior to entering the filtering means and providing a corresponding signal, a dilution signal means connected to the flow rate sensing means for dividing the solvent flow rate signal with the waxy oil flow rate signal to provide an actual dilution signal D, X signal means connected to the dilution signal means for providing a signal corresponding to a factor X in accordance with the dilution signal D and the following equation:

$$X = D/(1+D),$$

$X'$ signal means receiving the X factor signal for providing an $X'$ signal corresponding to an increased value for X in accordance with the following equation:

$$X' = X + \Delta X,$$

$X''$ signal means receiving the X signal for providing a signal $X''$ corresponding to a decreased value for X in accordance with the following equation:

$$X'' = X - \Delta X,$$

slurry viscosity signal means connected to the X signal means, to the refractive index signal means, to the viscosity sensing means and to the temperature sensing means for providing a signal corresponding to the viscosity $V_{mT}$ of the slurry mix at the filtering temperature; comparing means receiving the reference signals and the $V_{mT}$ signal for comparing the $V_{mT}$ signal with the reference signals to provide at least two outputs corresponding to the comparisons, first switching means connected to the $X'$ signal means and to the $X''$ signal means and controlled by the outputs from the comparing means to pass the $X''$ signal when the viscosity signal $V_{mT}$ exceeds the one reference signal and to pass the increased value $X'$ signal when the viscosity signal $V_{mT}$ exceeds the other reference limit and to pass no signal from the $X'$ signal means and from the $X''$ signal means when the viscosity $V_{mT}$ does not exceed either limit, $D'$ signal means connected to the first switching means for providing a signal corresponding to a new value $D'$ for the dilution ratio in accordance with a passed signal from the first switching means, and second switching means connected to the $D'$ signal means, to the D signal means and to the comparing means for passing the $D'$ signal as a desired dilution signal $D_D$ when the viscosity signal $V_{mT}$ exceeds a limit and for passing the D signal from the divider means as the $D_D$ signal when the viscosity signal $V_{mT}$ does not exceed a limit, circuit means for providing the control signals to the flow control means in accordance with the desired dilution signal $D_D$.

2. A system as described in claim 1 in which the solvent is MEK/toluene and the slurry viscosity signal means includes C signal means connected to the refractive index sensing means for providing a signal C corresponding to the fractional concentration of MEK in the solvent, pour point signal means for providing a signal corresponding to a predetermined pour point reduction $\Delta$ Pour, Saybolt viscosity signal means connected to the pour point signal means and to the viscosity sensing means for providing a signal corresponding to the Saybolt viscosity of the waxy oil at 210°F, dewaxed oil viscosity signal means connected to the Saybolt viscosity signal means for providing a signal $V_{DO}$ corresponding to the viscosity of the dewaxed oil, in accordance with the signal from the Saybolt viscosity signal means, zero degree slurry viscosity signal means connected to the X signal means to the dewaxed oil viscosity signal means for providing an $\ln V_{mO}$ signal corresponding to the natural logarithm of the viscosity $V_{mO}$ of the slurry mix at 0°F, and network means connected to the zero degree slurry viscosity signal means and to the temperature sensing means for providing the $V_{mT}$ signal corresponding to the viscosity of the slurry mix at the filtering temperature in accordance with the $\ln V_{mO}$ and $T_F$ signals.

3. A system as described in claim 2 in which the C signal means provides the C signal in accordance with the following equation:

$$C = (K_1 - RI)/K_2$$

where $K_1$ and $K_2$ are constants.

4. A system as described in claim 3 in which the Saybolt viscosity signal means includes logarithm signal means connected to the viscosity sensing means for providing a signal corresponding to the logarithm of the viscosity $V_{wo}$ of the waxy oil, log $V_{210}$ signal means connected to the logarithm signal means and to the pour point signal means for providing a signal corresponding to the logarithm of the Saybolt viscosity $V_{210}$ of the waxy oil in accordance with the log $V_{wo}$ signal and the $\Delta$ Pour signal in the following equation:

$$\log V_{210} = K_{22} + K_{23} \log V_{wo} + K_{24} (\Delta \text{Pour}), K$$

where $K_{22}$, $K_{23}$ and $K_{24}$ are constants.

5. A system as described in claim 4 in which the dewaxed oil viscosity signal means provides the $V_{DO}$ signal in accordance with the following equation:

$$V_{DO} = K_{19} V_{210} - \frac{(K_{20} V_{210})}{(V^3_{210} + K_{21})},$$

where $K_{19}$, $K_{20}$ and $K_{21}$ are constants.

6. A system as described in claim 5 in which the zero degree slurry viscosity signal means includes a ln $V_{DO}$ signal means connected to the $V_{DO}$ signal means for providing a ln $V_{DO}$ signal corresponding to the natural logarithm of the $V_{DO}$ signal, an F signal means connected to the ln $V_{DO}$ signal means for providing an F signal corresonding to a factor F in accordance with the following equation:

$$F = K_3 + K_4(\ln V_{DO}),$$

where $K_3$ and $K_4$ are constants, a G signal means connected to the ln $V_{DO}$ signal means for providing a G signal corresponding to a factor G in accordance with the following equation:

$$G = K_5 \text{ and } K_6(\ln V_{DO}),$$

where $K_5$ and $K_6$ are constants, an H signal means connected to the ln $V_{DO}$ signal means for providing an H signal corresponding to a factor H in accordance with the following equation:

$$H = K_7 + K_8(\ln V_{DO}),$$

where $K_7$ and $K_8$ are constants, a J signal means connected to the ln $V_{DO}$ signal means for providing a J signal corresponding to a factor J in accordance with the following equation:

$$J = K_9 + K_{10}(\ln V_{DO}),$$

where $K_9$ and $K_{10}$ are constants, a $K_0$ signal means connected to the ln $V_{DO}$ signal means for providing a $K_0$ signal corresponding to a factor $K_0$ in accordance with the following equation:

$$K_0 = K_{11} + K_{12}(\ln V_{DO}),$$

where $K_{11}$ and $K_{12}$ are constants, an L signal means connected to the ln $V_{DO}$ signal means for providing an L signal corresponding to a factor L in accordance with the following equation:

$$L = K_{13} + K_{14}(\ln V_{DO}),$$

where $K_{13}$ and $K_{14}$ are constants, and ln $V_{mO}$ network means for providing the signal l $V_{mO}$ in accordance with the C, F, G, H, J, $K_0$, L and X signals and the following equation:

$$\ln V_{mO} = F + GX + HCX + JC^2X^2 + K_0CX^2 + LX^2.$$

7. A system as described in claim 6 in which the $V_{mT}$ network means includes a $V_{mT}$ circuit means connected to the ln $V_{mO}$ network means and to the temperature sensing means for providing a signal ln $V_{mT}$ corresponding to the natural log of the viscosity of the slurry mix at the filtering temperature in accordance with the ln $V_{mO}$ signal and the $T_F$ signal and the following equation:

$$\ln V_{mT} = \ln V_{mO} + K_{15}(\ln V_{mO})\frac{(T_F)^2}{K_{16}} - [K_{17} + K_{18}(\ln V_{mO})](\frac{T_F}{K_{16}}),$$

where $T_F$ is the sensed filtering temperature and $K_{15}$, $K_{16}$, $K_{17}$ and $K_{18}$ are constants, and anti-log means for converting the ln $V_{mT}$ signal to the $V_{mT}$ signal.

8. A control system as described in claim 7 in which the constants $K_1$ through $K_{24}$ have the following ranges of values: 1.3775 to 1.4965, 0.05 to 0.119, 1.0 to 1.5, 2.0 to 3.0, 2.0 to 3.0, 0.0 to −10.0, 0.0 to 10.0, 0.0 to −10.0, 0.0 to 10.0, 10.0 to 20.0, −5.0 to −15.0, 0.0 to −10.0, 0.0 to 10.0, 0.0 to 1.0, 50.0 to 156.0, 0.0 to 1.0, 0.5 to 1.5, 0.0 to 0.5, 10,000 to 12,000, 35,000 to 40,000, 0.0 to −0.5, 0.5 to 1.5 and 0.0 to 0.01, respectively.

9. A control system as described in claim 8 in which the constants $K_1$ through $K_{24}$ have preferred values of 1.4965, 0.119, 1.054, 2.5, 2.569, −7.06, −8.758, 6.22, −4.544, 3.37, 13,482, −10.16, −4.775, 5.6, 0.69, 100.0, 0.631, 0.911, 0.21443, 11,219, 37,755, −0.2055, 1.0432 and 0.001021, respectively.

10. A system for monitoring a dewaxing apparatus to provide an output $V_{mT}$ corresponding to a slurry mix viscosity at a filtering temperature in which the solvent is mixed with waxy oil at some ratio of solvent to waxy oil and the solvent-waxy mixture is chilled to some filtering temperature by chiller means to become the slurry mix which is provided to filtering means also receiving wash solvent at a predetermined flow rate and which provides a dewaxed oil and solvent mixture and wax, said monitoring system comprising flow rate sensing means for sensing the flow rates of the solvent and the waxy oil and providing signals corresponding thereto, viscosity sensing means for sensing the viscosity $V_{wo}$ of the waxy oil and providing a corresponding signal, refractive index sensing means for determining the refractive index RI of the solvent and providing a signal corresponding thereto, temperature sensing means for sensing the temperature of the slurry mix and providing a corresponding signal $T_F$, dilution ratio signal means connected to the flow rate sensing means for dividing the solvent flow rate signal with the waxy oil flow rate signal to provide a dilution ratio signal D, X signal means connected to the dilution ratio signal means for providing a signal corresponding to a factor X in accordance with the D signal and the following equation:

$$X = D/(D), +D),$$

and output means connected to the X signal means, to the refractive index, to the temperature sensing means and to the viscosity sensing means for providing the output $V_{mT}$ in accordance with the X signal, the RI signal, the $V_{wo}$ signal and the $T_F$ signal.

11. A system as described in claim 10 in which the solvent is MEK/Toluene and the output means includes means connected to the refractive index signal means for providing a signal C corresponding to the fractional concentration of MEK in the solvent, pour point signal means for providing a Δ Pour signal corresponding to a predetermined pour point reduction Δ Pour Saybolt viscosity signal means connected to the pour point signal means and to the viscosity sensing means for providing a signal corresponding to the Saybolt viscosity of the waxy oil at 210°F, dewaxed oil viscosity signal means connected to the Saybolt viscosity signal means for providing a signal $V_{DO}$ corresponding to the viscosity of the dewaxed oil, in accordance with the signal from the Saybolt viscosity signal means, zero degree viscosity signal means connected to the X signal means and to the dewaxed oil viscosity signal means for providing a signal corresponding to the viscosity $V_{mo}$ of the slurry mix at 0°F, and network means connected to the zero degree viscosity signal means and to the temperature sensing means for providing the output $V_{mT}$ in accordance with the $V_{mo}$ and $T_F$ signals.

12. A system as described in claim 11 in which the C signal means provides the C signal in accordance with the following equation:

$$C = \frac{(K_1 - RI)}{K_2}$$

where $K_1$ and $K_2$ are constants.

13. A system as described in claim 12 in which the Saybolt viscosity signal means includes logarithm signal means connected to the viscosity sensing means for providing a log $V_{wo}$ signal corresponding to the logarithm of the viscosity $V_{wo}$ of the waxy oil, log $V_{210}$ signal means connected to the logarithm means and to the pour point signal means for providing a signal corresponding to the logarithm of the Saybolt viscosity $V_{210}$ of the waxy oil in accordance with the Log $V_{wo}$ signal and the Pour signal and the following equation:

$$\log V_{210} = K_{22} + K_{23} \log V_{wo} + K_{24} (\Delta \text{Pour}),$$

where $K_{22}$, $K_{23}$ and $K_{24}$ are constants.

14. A system as described in claim 13 in which the dewaxed oil viscosity signal means provides the $V_{DO}$ signal in accordance with the following equation:

$$V_{DO} = K_{19} V_{210} - \frac{(K_{20} V_{210})}{(V^3_{210} + K_{21})},$$

where $K_{19}$, $K_{20}$ and $K_{21}$ are constants.

15. A system as described in claim 14 in which the zero degree
   viscosity signal means includes an ln $V_{DO}$ signal means connected to the $V_{DO}$ signal means for providing a signal corresponding to the natural logarithm of the $V_{DO}$ signal, an F signal means connected to the ln $V_{DO}$ signal means for providing an F signal corresponding to a factor F in accordance with the following equation:

$$F = K_3 + K_4 (\ln V_{DO}),$$

where $K_3$ and $K_4$ are constants, a G signal means connected to the ln $V_{DO}$ signal means for providing a G signal corresponding to a factor G in accordance with the following equation:

$$G = K_5 \text{ and } K_6 (\ln V_{DO}),$$

where $K_5$ and $K_6$ are constants, an H signal means connected to the natural ln $V_{DO}$ signal means for providing an H signal corresponding to a factor H in accordance with the following equation:

$$H = K_7 + K_8 (\ln V_{DO}),$$

where $K_7$ and $K_8$ are constants, a J signal means connected to the ln $V_{DO}$ signal means for providing a J signal corresponding to a factor J in accordance with the following equation:

$$J = K_9 + K_{10} (\ln V_{DO}),$$

where $K_9$ and $K_{10}$ are constants, a $K_O$ signal means connected to the ln $V_{DO}$ signal means for providing a $K_O$ signal corresponding to a factor $K_O$ in accordance with the following equation:

$$L = K_{13} + K_{14} (\ln V_{DO})$$

where $K_{13}$ and $K_{14}$ are constants, and ln $V_{mO}$ network means for providing the signal ln $V_{mO}$ in accordance with the C, F, G, H, J, $K_O$, L and X signals and the following equation:

$$\ln V_{mO} = F + GX + HCX + JC^2X^2 + K_O CX^2 + LX^2.$$

16. A system as described in claim 15 in which the $V_{mT}$ network means includes $V_{mT}$ circuit means connected to the (ln $V_{mO}$ network means and to the temperature sensing means for providing a signal ln $V_{mT}$ corresponding to the natural log of the viscosity of the slurry mix at the filtering temperature in accordance with the ln $V_{mO}$ signal and the $T_F$ signal and the following equation:

$$\ln V_{mT} = \ln V_{mO} + K_{15} [V_{mO}] \frac{(T_F)^2}{K_{16}} - [K_{17} + K_{18}(\ln V_{mO})](\frac{T_F}{K_{16}}),$$

where $T_F$ is the sensed filtering temperature and $K_{15}$, $K_{16}$, $K_{17}$ and $K_{18}$ are constants, and means for converting the ln $V_{mT}$ signal to the $V_{mT}$ output.

17. A system as described in claim 16 in which the constants $K_1$ through $K_{24}$ have the following ranges of values: 1.3775 to 1.4965, 0.05 to 0.119, 1.0 to 1.5, 2.0 to 3.0, 2.0 to 3.0, 0.0 to −10.0, 0.0 to −10.0, 0.0 to 10.0, 0.0 to −10.0, 0.0 to 10.0, 10.0 to 20.0, −5.0 to −15.0, 0.0 to −10.0, 0.0 to 10.0, 0.0 to 1.0, 50.0 to 156.0, 0.0 to 1.0, 0.5 to 1.5, 0.0 to 0.5, 10,000 to 12,000, 35,000 to 40,000, 0.0 to −0.5 to 1.5 and 0.0 to 0.01, respectively.

18. A system as described in claim 17 in which the constants $K_1$ through $K_{24}$ have preferred values of 1.4965, 0.119, 1.054, 2.5, 2.569, −7.06, −8,758, 6.22 −4.544, 3.37, 13,482, −10.16, −4.775, 5,6, 0.69, 100.0, 0.631, 0.911, 0.21443, 11,219, 37,755, −0.2055, 1.0432 and 0.001021, respectively.

* * * * *

UNITED STATES PATENT AND TRADEMARK OFFICE
CERTIFICATE OF CORRECTION

PATENT NO. : 3,972,779
DATED : July 26, 1974
INVENTOR(S) : CHARLES W. HARRISON

It is certified that error appears in the above-identified patent and that said Letters Patent are hereby corrected as shown below:

Column 8, line 61:
"$\log V_{210} = K_{22} + K_{23} \log V_{wo} + K_{24}(\Delta \text{Pour}), K$"

should read

--$\log V_{210} = K_{22} + K_{23} \log V_{wo} + K_{24}(\Delta \text{Pour})$--

Column 9, line 9:
"corresonding" should read --corresponding--

Column 9, line 48:
"$1V_{m0}$" should read --$\ln V_{m0}$--

Column 10, line 46:
"$X = D/(D), +D)$", should read --$X = D/(1+D)$--

Column 12, line 28:
"(ln" should read --ln--

Column 12, line 35:
"$\ln V_{mT} = \ln V_{m0} + K_{15}[V_{m0}]\overline{K_{16}}^{(T_F)^2} [K_{17} + K_{18}(\ln V_{m0})]^{(\frac{T_F}{K_{16}})}$,"

should read

--$\ln V_{mT} = \ln V_{m0} + K_{15} \ln V_{m0} \frac{(T)^2}{K_{16}} - [K_{17} + K_{18}(\ln V_{m0}) \frac{(T)}{K_{16}}]$--

Signed and Sealed this

Twenty-sixth Day of April 1977

[SEAL]

Attest:

RUTH C. MASON
*Attesting Officer*

C. MARSHALL DANN
*Commissioner of Patents and Trademarks*